United States Patent
Cao

(10) Patent No.: US 12,137,486 B2
(45) Date of Patent: Nov. 5, 2024

(54) NETWORK CONNECTION METHOD, TERMINAL, BASE STATION, AND COMPUTER STORAGE MEDIUM

(71) Applicant: GUANGDONG OPPO MOBILE TELECOMMUNICATIONS CORP., LTD., Dongguan (CN)

(72) Inventor: Jun Cao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 539 days.

(21) Appl. No.: 17/472,076

(22) Filed: Sep. 10, 2021

(65) Prior Publication Data

US 2021/0410206 A1     Dec. 30, 2021

Related U.S. Application Data

(63) Continuation of application No. PCT/CN2020/077490, filed on Mar. 2, 2020.

(30) Foreign Application Priority Data

Mar. 12, 2019 (CN) .......................... 201910186221.5

(51) Int. Cl.
*H04W 76/10* (2018.01)
*H04W 52/38* (2009.01)

(52) U.S. Cl.
CPC ........... *H04W 76/10* (2018.02); *H04W 52/38* (2013.01)

(58) Field of Classification Search
CPC ... H04W 48/18; H04W 52/367; H04W 52/50; H04W 88/06; H04W 76/16; H04W 76/15; H04W 52/38; H04W 76/10; Y02D 30/70
See application file for complete search history.

(56) References Cited

U.S. PATENT DOCUMENTS

2015/0257147 A1* 9/2015 Ji .......................... H04W 92/20
                                                        370/329
2018/0192443 A1    7/2018 Novlan et al.
(Continued)

FOREIGN PATENT DOCUMENTS

CN     107343279 A    11/2017
CN     108632880 A    10/2018
(Continued)

OTHER PUBLICATIONS

Apple, "Performance comparison of single Tx and dual Tx for intra-band EN-DC", 3GPP TSG-RAN WG4 Meeting #86bis, R4-1805323, Melbourne, Australia, Apr. 16-20, 2018, 10 pages.
(Continued)

*Primary Examiner* — Donald L Mills
(74) *Attorney, Agent, or Firm* — BAYES PLLC

(57) ABSTRACT

A terminal device is disclosed, including a first receiving component, an initiating component, a first acquiring component, a determining component, and a first sending component. The first receiving component is configured to receive a connection indication from a base station. The connection indication includes a target connection mode when the terminal is in a non-standalone (NSA) network. The initiating component is configured to initiate a preset service monitoring function when the target connection mode is a preset time-sharing connection mode. The first acquiring component is configured to acquire a current service type. According to the current service type, the determining component is configured to determine a target network mode which is one of multiple network modes in the NSA network. The first sending component is configured to transmit the target network mode to the base station for connection with the target network mode in response to the connection indication.

20 Claims, 5 Drawing Sheets

(56) References Cited

U.S. PATENT DOCUMENTS

| | | | |
|---|---|---|---|
| 2018/0367230 A1 | 12/2018 | Su et al. | |
| 2018/0376384 A1* | 12/2018 | Youn | H04W 36/14 |
| 2019/0045341 A1* | 2/2019 | Huang | H04L 41/0803 |
| 2019/0069205 A1 | 2/2019 | Lee et al. | |
| 2022/0159569 A1* | 5/2022 | Yuan | H04W 52/0229 |

FOREIGN PATENT DOCUMENTS

| | | | | |
|---|---|---|---|---|
| CN | 108696881 A | * | 10/2018 | H04W 24/02 |
| CN | 109151931 A | | 1/2019 | |
| CN | 109219157 A | | 1/2019 | |
| CN | 109246823 A | | 1/2019 | |
| CN | 109451861 A | | 3/2019 | |
| CN | 109890069 A | | 6/2019 | |

OTHER PUBLICATIONS

OPPO, "Discussion on HPUE for inter-band EN-DC", 3GPP TSG-RAN WG4 Meeting #90, R4-1901321, Athens, GR, Feb. 25-Mar. 1, 2019, 3 pages.

The first Office Action issued in corresponding Chinese Application No. 201910186221.5., mailed on Mar. 16, 2020, 10 pages.

Notification to Grant Patent Right for Invention issued in corresponding Chinese Application No. 201910186221.5, mailed on Apr. 24, 2020, 6 pages.

Li, Hai-zhen et al., "4G-5G Dual Connectivity Technology", Information Security and Communication Confidentiality Magazine, Analysis of 4G-5G Dual Connectivity Technology[J].Communications Technology, dated Jan. 1, 2019, 13 pages.

International Search Report issued in corresponding International Application No. PCT/CN2020/077490, mailed on May 20, 2020, 12 pages.

The supplementary European search report Dated Jul. 19, 2022 from European patent application No. 20770499.0.

The first Office Action Date Dec. 29, 2021 from from China Application No. 202010504563.X.

The partial supplementary European search report dated Mar. 25, 2022 from European patent application No. 20770499.0, 34 pages.

The Notice of Allowance dated Apr. 7, 2022 from Chinese patent application No. 202010504563.X, 4 pages.

* cited by examiner

NETWORK CONNECTION METHOD, TERMINAL, BASE STATION, AND COMPUTER STORAGE MEDIUM

CROSS-REFERENCE TO RELATED APPLICATIONS

This application is a continuation of International Application No. PCT/CN2020/077490, filed on Mar. 2, 2020, which claims priority of Chinese Application No. 201910186221.5 filed on Mar. 12, 2019, the entire contents of which are incorporated herein by reference.

BACKGROUND

The present disclosure relates to the field of network communication, and in particular, to a network connection method, terminal, base station, and computer storage medium.

LTE (Long Term Evolution), as a follow-up evolution technology of 3G, has unique technical advantages such as high data rate, low latency, and flexible bandwidth configuration. The fifth-generation mobile communication technology (5th-Generation, 5G) has become a global research and development hotspot. 5G can be seen as an extension after LTE. At the 78th plenary meeting of the International Telecommunications Standards Organization, the first version of the 5G New Radio (NR) was officially frozen and released. NR networking defines two schemes, namely Standalone networking (Standalone, SA) and non-standalone networking (non-standalone, NSA).

At present, NR is gradually starting to deploy networks. At present, the NSA networking mode is mainly adopted, and the dual connection mode (EN-DC) of 4G wireless access network and 5 GNR is adopted. However, due to the limitation of the radio frequency power of the terminal, when the transmission power of LTE and NR are both large, the terminal will have a greater risk of network coverage and reduce security.

SUMMARY

The embodiments of the present disclosure provide a network connection method, terminal, base station, and computer storage medium, which can reduce network connection links, speed up the network connection rate, and effectively improve the stability of the network connection during network connection. In a first aspect, a method of compression processing is provided. The method includes the following operations.

The technical solutions of the embodiments of the present disclosure are implemented as follows:

The embodiments of the present disclosure provides a method for network establishment, applied in a terminal, wherein the method includes receiving, by the terminal, a connection indication from a base station when in a non-standalone (NSA) network, wherein the connection indication includes a target connection mode; initiating, by the terminal, a preset service monitoring function when the target connection mode is a preset time-sharing connection mode, and acquiring, by the terminal, a current service type; determining, by the terminal, a target network mode according to the current service type, wherein the target network mode is any one of multiple network modes in the NSA network; in response for the connection indication, transmitting, by the terminal, the target network mode to the base station for connection with the target network mode.

The embodiments of the present disclosure provide a network connection method applied to a base station, wherein the method includes detecting in real time, by the base station, multiple transmission powers corresponding to multiple network modes when in a non-standalone (NSA) network, wherein each network mode corresponds to one transmission power; acquiring, by the base station, a target connection mode in accordance with the multiple transmission powers and a preset power threshold; sending, by the base station, a connection indication to a terminal, wherein the connection indication conveys the target connection mode; receiving, by the base station, a target network mode from the terminal for connection between the terminal and the target network mode when the target connection mode is a preset time-sharing connection mode, wherein the target network mode is any one of multiple network modes in the NSA network.

The embodiments of the present disclosure provide a network connection method, terminal, base station, and computer storage medium. The method includes receiving, by the terminal, a connection indication from a base station when in a non-standalone (NSA) network, wherein the connection indication includes a target connection mode; initiating, by the terminal, a preset service monitoring function when the target connection mode is a preset time-sharing connection mode, and acquiring, by the terminal, a current service type; determining, by the terminal, a target network mode according to the current service type, wherein the target network mode is any one of multiple network modes in the NSA network; in response for the connection indication, transmitting, by the terminal, the target network mode to the base station for connection with the target network mode. The connection with the target network mode can meet the requirements of terminal radio frequency power when in an NSA network. When the transmission power of LTE and NR are both large, the risk of the terminal is reduced, and the security is improved.

DETAILED DESCRIPTION

Figure 1:
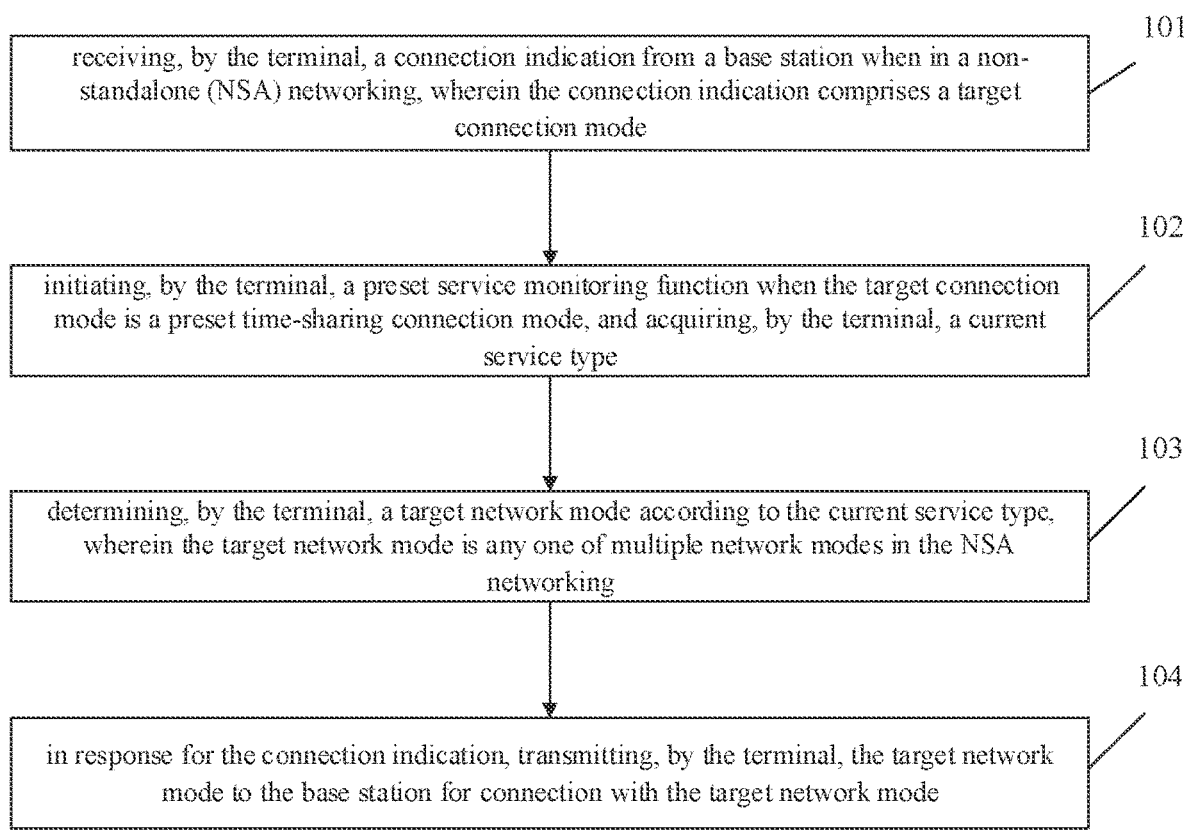
FIG. 1 is a schematic diagram of the implementation process of a network connection method proposed in an embodiment of the present disclosure.

The technical solutions in the embodiments of the present disclosure will be clearly and completely described below in combination with the drawings in the embodiments of the present disclosure. It is understandable that the specific embodiments described in the disclosure are only used to explain the related disclosure, but not to limit the disclosure.

In addition, it should be noted that, for ease of description, only the parts related to the relevant disclosure are shown in the drawings.

When 4G evolves to 5G, the radio access network and core network are disassembled, and 5G NR, 5G core network, 4G core network, and LTE mix and match to form an evolution route for multiple network deployment options.

NSA refers to 4G independently deploys the control plane (4G bearer control signaling), 5G and 4G jointly deploys user plane (5G and 4G bearer user plane data) or 5G independently deploys the user plane (only 5G bearer user plane data), SA refers to 5G independently deploys control plane and user plane (5G independent bearer control signaling and user plane data). The SA mode of 5G NR requires independent deployment of 5G end-to-end networks and new base stations and core networks, so 5G can work independently from 4G. The NSA mode can rely on the existing 4G network to meet the first-mover needs of some operators on 5G.

The so-called non-standalone networking is the dual connection of LTE and NR. Due to the difference in a specific implementation, NSA includes three different architectures: the 4G core network, a primary station of 4G base station, a secondary station of 5G base station (EN-DC), NSA mode; 5G core network, a primary station of 5G base station, a secondary station of 4G base station (NE-DC) and NSA mode; 5G core network, a primary station of 4G base station, a secondary station of 5G base station (NGEN-DC). Where DC represents for Dual Connectivity, which means dual connectivity; E represents for E-UTRA, i.e., 4G wireless access network; N represents for NR, i.e., 5G new interface; NG represents for next-generation core network, i.e., 5G core network.

In other words, EN-DC refers to the dual connection of 4G wireless access network and 5G NR, NE-DC refers to the dual connection of 5G NR and 4G wireless access network, and NGEN-DC refers to the dual connection of 4G wireless access network and 5G NR under the 5G core network.

There are various types of networks and terminals, and there may be situations where 5G cells or terminals only support NSA, only support SA, or support both NSA and SA.

At present, there are more and more NSA networkings, and the LTE and NR dual connection mode of the EN-DC solution is generally adopted. Due to the limited requirements of terminal radio frequency power, in general, the maximum power of the terminal cannot exceed 23 Lbm. Therefore, when the transmission power of LTE and NR are both large, for example, when the transmission power of both LTE and NR reaches 20 dbm, the terminal will have a greater risk of network coverage, which reduces security.

Furthermore, in the embodiments of the present disclosure, the NSA includes three different architectures: EN-DC, NE-DC, and NGEN-DC, which are not specifically limited in this disclosure. Specifically, this disclosure uses a 4G core network, such as EN-DC, with a 4G base station as the primary station and a 5G base station as the secondary station.

The technical solutions in the embodiments of the present disclosure will be clearly and completely described below in combination with the drawings in the embodiments of the present disclosure.

On embodiment of this disclosure provides a network connection method. F FIG. 1 is a schematic diagram of the implementation process of a network connection method proposed in an embodiment of the present disclosure. As shown in FIG. 1, in the embodiment of this disclosure, the network connection method applied in a terminal can include the following steps:

Step 101: receiving a connection indication from a base station when in a non-standalone (NSA) networking, wherein the connection indication includes a target connection mode.

In the embodiment of the present disclosure, when the terminal is in a non-networking, the terminal can receive a connection indication sent by the base station.

It should be noted that, in the embodiment of the present disclosure, the connection indication can be the determination of the connection mode made by the base station where the connection indication conveys the target connection mode.

Furthermore, in the embodiment of the present disclosure, when both the terminal and the base station are in an NSA networking, the preset simultaneous connection mode may be a mode in which multiple network modes in the non-standalone networking are all in the connected state, and the preset time-sharing connection mode may be a mode in which multiple network modes in an NSA networking are not in a connected state at the same time. If the NSA networking is a dual connection between LTE and NR New Wireless, then the target connection mode can be the preset simultaneous connection mode or the preset time-sharing connection mode. The preset simultaneous connection mode may be a mode in which both LTE and NR are in a connected state, and the preset time-sharing connection mode may be a mode in which LTE and NR are not in a connected state at the same time.

Furthermore, in the embodiment of the present disclosure, the NSA may be an EN-DC architecture with a 4G core network, a 4G base station as a primary station, and a 5G base station as a secondary station.

It should be noted that, in the embodiment of the present disclosure, the terminal and the base station may belong to the same area and are in the same NSA networking at the same time.

It should be noted that in the embodiments of the present disclosure. According to the different needs of operators, in the actual network deployment of 5G, SA networking and NSA networking may cover different areas, but it may also be that a certain area has standalone networking or non-standalone networking. For example, a 5G base station can work in standalone networking mode to support independent access to the 5G network for the user plane and control plane of the terminal, and the base station can also work in non-standalone networking mode to support terminals. The control plane is anchored in the existing LTE network, and the 5G network is used to carry user plane data transmission.

Furthermore, in the embodiment of the present disclosure, the terminal and the base station can switch between the preset simultaneous connection mode and the preset time-sharing connection mode. Specifically, when the terminal and the base station are in a preset time-sharing connection mode, the terminal can switch between LTE and NA.

It should be noted that, in the embodiment of the present disclosure, before the terminal receives the connection indication sent by the base station, the base station and the terminal may be in a preset simultaneous connection mode or a preset time-sharing connection mode.

Furthermore, in the embodiments of the present disclosure, the aforementioned terminal may be any terminal with communication and storage functions, such as: tablet computer, mobile phone, e-reader, remote control, personal computer (PC), notebook computer, Terminals such as invehicle equipment, Internet TV, wearable equipment, personal digital assistant (PDA), portable media player (PMP), navigation device, etc.

It should be noted that in the embodiments of the present disclosure, due to the limitation of the terminal radio frequency power, in general, the maximum power of the terminal cannot exceed 23 Lbm, and when the transmit power of LTE and NR are both large, the terminal will have a large Network coverage risk. Therefore, the base station can determine a safer and more suitable target connection mode according to the transmission power of both LTE and NR, that is, select between a preset time-sharing connection mode and a preset simultaneous connection mode. For example, when both LTE and NR transmit powers reach 20 dbm, the station can set the target connection mode to the preset time-sharing connection mode, and send the preset time-sharing connection mode to the terminal through the connection indication.

Step 102: initiating a preset service monitoring function when the target connection mode is a preset time-sharing connection mode, and acquiring, by the terminal, a current service type.

In the embodiment of the present disclosure, after the terminal receives the connection indication sent by the base station, if the target connection mode carried in the connection indication is the preset time-sharing connection mode, the terminal can initiate the preset service monitoring function to obtain the current service type.

It should be noted that, in the embodiment of the present disclosure, when the target connection mode is the preset time-sharing connection mode, the terminal can select any network between LTE and NA for connection, and at the same time, it can also connect between LTE and NA. Therefore, the terminal needs to monitor the current service type. That is, the preset service monitoring function needs to be initiated, so that the current service type can be monitored for further selection of a suitable network for connection.

Furthermore, in the embodiment of the present disclosure, the preset service monitoring function is used to monitor the status parameters and execution parameters of the terminal. In other words, after the terminal initiates the preset service monitoring function, current status parameters and current execution parameters of the terminal can be monitored. Specifically, after the terminal monitors and obtains the current status parameters and current execution parameters, it can calculate the current service type according to the current status parameters and current execution parameters.

It should be noted that, in the embodiment of the present disclosure, the terminal may be configured with a service mode calculate module, which can monitor and calculate the current service mode of the terminal through a preset service monitoring function.

Step 103: determining, by the terminal, a target network mode according to the current service type, wherein the target network mode is any one of multiple network modes in the NSA networking.

In the embodiment of the present disclosure, initiating a preset service monitoring function when the target connection mode is a preset time-sharing connection mode, and acquiring, by the terminal, a current service type, the terminal can determine the target network mode corresponding to the current service type according to the current service type.

It should be noted that, in the embodiment of the present disclosure, the target network mode may be any one of multiple network modes in the non-standalone networking. For example, for the LTE and NR dual connection mode of the EN-DC solution, the target network mode can be either the LTE mode or the NR mode.

Furthermore, in the embodiment of the present disclosure, after determining the current service type, the terminal can continue to determine the occupancy ratio of different network resource allocation according to the current service type, so that the target network mode can be further selected from multiple network modes. For example, for the LTE and NR dual connection mode of the EN-DC scheme, the terminal can choose to access the 4G network or the 5G network. For example, if the current service type of the terminal is an automatic driving scenario that requires low latency and high reliability, the terminal may further determine that it needs to occupy more NR resource allocation ratio, and therefore, the terminal may determine NR as the target network mode.

Step 104: in response to the connection indication, transmitting the target network mode to the base station for connection with the target network mode.

In the embodiment of the present disclosure, after the terminal determines the target network mode corresponding to the current service type according to the current service type, it can respond to the connection indication sent by the base station and send the target network mode to the base station so that it can connect to the target network mode.

Furthermore, in the embodiment of the present disclosure, when the target connection mode carried in the connection indication is the preset time-sharing connection mode, i.e., the base station indicating the terminal to select any network between LTE and NA for connection, and the terminal will determine a suitable target network mode according to the current service type, which is monitored and obtained by the terminal, and then send the target network mode to the base station to inform the base station, and the base station can control the terminal to access the target network mode.

It should be noted that in the embodiment of the present disclosure, when the target connection mode carried in the connection indication is the preset time-sharing connection mode, the terminal can switch the connection between LTE and NA according to the real-time service type, in other words, the terminal can continuously adjust and optimize according to its own execution parameters and status parameters to determine a more suitable network for connection, i.e., the terminal can continuously perform network switching to obtain the best user experience.

In the embodiment of the present disclosure, further, when in a non-standalone networking, after the terminal receives the connection indication sent by the base station, that is, after step 101, the method for the terminal to connect to the network may further include the following steps:

Step 105: shutting down the preset service monitoring function when the target connection mode is a preset simultaneous connection mode.

In the embodiment of the present disclosure, after the terminal receives the connection indication sent by the base station, if the target connection mode carried in the connection indication is the preset simultaneous connection mode, the terminal can shut down the preset service monitoring function.

It should be noted that in the embodiment of the present disclosure, when the target connection mode is the preset simultaneous connection mode, the terminal can connect to LTE and NA at the same time. That is, the terminal does not need to switch connections between LTE and NA Therefore, the terminal does not need to monitor the current service type, that is, the terminal can shut down the preset service monitoring function.

In the embodiment of the present disclosure, further, after the terminal responds to the connection indication and sends the target network mode to the base station to connect to the target network mode, that is, after step 104, the method for the terminal to connect to the network may further include the following steps:

Step 106: continuing to update the present service type in real-time via monitoring the preset service monitoring function, for updating the target connection mode and obtaining an updated target connection mode.

In the embodiment of this disclosure, after the terminal sends the target network mode to the base station and is connected to the target network mode, the terminal can continue to update the current service type in real time through the preset service monitoring function, so that the target network mode can be updated in real time, And then get the updated target network mode.

It should be noted that, in the embodiment of this disclosure, after the terminal is connected to the target network mode, it can continue to monitor the status parameters and execution parameters of the terminal in real time through the preset service monitoring function, and perform real-time monitoring based on the real-time status parameters and execution parameter calculation for obtaining the real-time service type, so that the current service type can be updated in real time.

Furthermore, in the embodiment of the present disclosure, after the terminal updates the current service type in real time, it can correspondingly update the target network mode in real time to obtain the updated target network mode.

It should be noted that in the embodiment of the present disclosure, the updated target network mode may be any one of the multiple network modes in the non-standalone networking. For example, for the LTE and NR dual connection mode of the EN-DC solution, the updated target network mode can be either the LTE mode or the NR mode. Specifically, the updated target network mode can be any network mode that is different from the target network mode in the non-standalone networking, that is, for the LTE and NR dual connection mode of the EN-DC scheme, when the target network mode. In the LTE mode, the updated target network mode is the NR mode.

Step 107: sending the updated target network mode to the base station for connection in the updated target network mode when the updated target connection mode is different from the target connection mode.

In the embodiment of the present disclosure, the terminal continues to update the current service type in real time via the preset service monitoring function to update the target network mode in real time, and after obtaining the updated target network mode, if the updated target network mode is different from the target network mode sent to the base station, then the terminal can send the updated target network mode to the base station again, so that the terminal can connect to the updated target network mode.

Furthermore, in the embodiment of the present disclosure, the terminal can continuously determine the corresponding target network mode according to the real-time service type. After the continuous updating, if the target network mode changes, the terminal can send an updated target network mode to the base station for connection with the target network mode. For example, when the initial current service type of the terminal requires low latency and high reliability in autonomous driving scenario, the terminal can determine NR as the target network mode after determining that the terminal needs to occupy more ratios in NR resource allocation, and connect to NR; then the terminal can continue to monitor the service type. After a while, when the terminal is in a call state and NR supports the IP multimedia subsystem, the terminal can determine to occupy more ratio in LTE resource allocation, determine the LTE as the updated target network mode and access the LTE.

In the network connection method proposed in the embodiment of the present disclosure, receiving, by the terminal, a connection indication from a base station when in a non-standalone networking, wherein the connection indication includes a target connection mode; initiating, by the terminal, a preset service monitoring function when the target connection mode is a preset time-sharing connection mode, and acquiring, by the terminal, a current service type; determining, by the terminal, a target network mode according to the current service type, wherein the target network mode is any one of multiple network modes in the NSA networking; in response for the connection indication, transmitting, by the terminal, the target network mode to the base station for connection with the target network mode. It can be seen that, in the implementation of this disclosure, when both the terminal and the base station are in a non-standalone networking, after the terminal receives the connection indication that conveys the target connection mode sent by the base station, if the target connection mode is the preset time-sharing connection mode, the terminal determines the current service type via the preset service monitoring function, and further determines the target network mode. The terminal sends the target network mode to the base station to achieve the connection with the target network mode, so that the terminal can meet the requirements of radio frequency power requirements when in the non-standalone networking. When the transmission power of LTE and NR are both large, the terminal can reduce the risk of the terminal and improve security.

In another embodiment of the present disclosure, based on the above embodiment, for the method of step 102, the method for the terminal to acquiring by the terminal the current service type may include the following steps:

Step 201: monitoring a current status parameter and a current execution parameter.

In the embodiment of the present disclosure, after the terminal initiates the preset service monitoring function, the current status parameters and current execution parameters of the terminal can be monitored.

Furthermore, in the embodiments of the present disclosure, the current status parameters of the terminal can be used to represent the power status, standby stats, and temperature status of the terminal; the current execution parameters of the terminal can be used to represent a running application program, working status of each application and configuration parameters, etc., are not subject to specific restrictions.

Step 202: acquiring the current service type according to the current status parameter and the current execution parameter.

In the embodiment of the present disclosure, after the terminal monitors the current status parameters and current execution parameters of the terminal, the terminal can acquire the current service type according to the current status parameters and current execution parameters.

It should be noted that, in the embodiment of the present disclosure, the terminal can monitor various parameters of the terminal through the preset service monitoring function, that is, the current status parameters and current execution parameters can be acquired by monitoring, so that the terminal can determine the corresponding current service type according to the current status parameters and current execution parameters. Specifically, the terminal may input the current status parameters and current execution parameters acquired by monitoring into the calculation model for determining the service type, and then output to obtain the corresponding current service type.

In the embodiment of the present disclosure, furthermore, for the step 103, the method for the terminal to determining, by the terminal, a target network mode corresponding to the current service type according to the current service type may include the following steps:

Step 103a: determining an occupancy ratio parameter of resource allocation.

In the embodiment of the present disclosure, after the terminal determines the current service type through the preset service monitoring function, it can determine the resource allocation parameters between different networks according to the current service type.

It should be noted that in the embodiments of the present disclosure, for different service types, the ratio of network resources allocation occupied by the terminal may be different. For example, for the LTE and NR dual connection mode of the EN-DC scheme, if the current service type of the terminal is a low-latency service type, the terminal can determine that the NR resource occupied is more than the LTE resource occupied, that is, the terminal needs to occupy more ratios of NR resource allocation; if the current service type of the terminal is a low-reliability service type, the terminal can determine that the LTE resources occupied are more than the NR resources occupied, that is, the terminal needs to occupy more ratios of LTE resource allocation.

Furthermore, in the embodiment of the present disclosure, the resource allocation ratio parameter may represent the relative ratio of each network resource required by the current service type of the terminal.

Step 103b: determining the target network mode according to the resource allocation ratio parameter.

In the embodiment of the present disclosure, after the terminal determines the resource allocation ratio parameter according to the current service type, the terminal may determine the target network mode according to the resource ratio parameter.

Furthermore, in the embodiment of the present disclosure, due to the resource ratio parameter can represent the relative ratio of each network resource required by the current service type of the terminal. That is, the resource ratio parameter can be used to determine that the terminal is in a non-standalone network. It is more necessary to connect to which network mode of the multiple network modes in the networking. Therefore, the terminal can further determine the target network mode after obtaining the resource allocation ratio parameter.

It should be noted that, in the embodiment of this disclosure, for the LTE and NR dual connection mode of the EN-DC scheme, the network mode in the non-standalone networking includes LTE and NR. Therefore, when the ratio of resources allocation between LTE and NR is that the ratio of LTE is greater than the ratio of NR, it means that the current service type of the terminal occupies more LTE resources, and the terminal can determine that the target network mode is LTE.

This disclosure proposes a network connection method, receiving, by the terminal, a connection indication from a base station when in a non-standalone (NSA) networking, wherein the connection indication includes a target connection mode; initiating, by the terminal, a preset service monitoring function when the target connection mode is a preset time-sharing connection mode, and acquiring, by the terminal, a current service type; determining, by the terminal, a target network mode according to the current service type, wherein the target network mode is any one of multiple network modes in the NSA networking; in response for the connection indication, transmitting, by the terminal, the target network mode to the base station for connection with the target network mode. It can be seen that, in the implementation of this disclosure, when both the terminal and the base station are in a non-standalone networking, after the terminal receives the connection indication sent by the base station, which conveys the target connection mode, if the target connection mode is the preset time-sharing connection mode, the terminal determines the current service type via the preset service monitoring function. And the terminal further determines the target network mode. The terminal sends the target network mode to the base station to achieve the connection with the target network mode, so that it can meet the requirements of the non-standalone networking when in the non-standalone networking. When the transmission power of LTE and NR are both large, the method can reduce the risk of the terminal and improve security.

Figure 2:
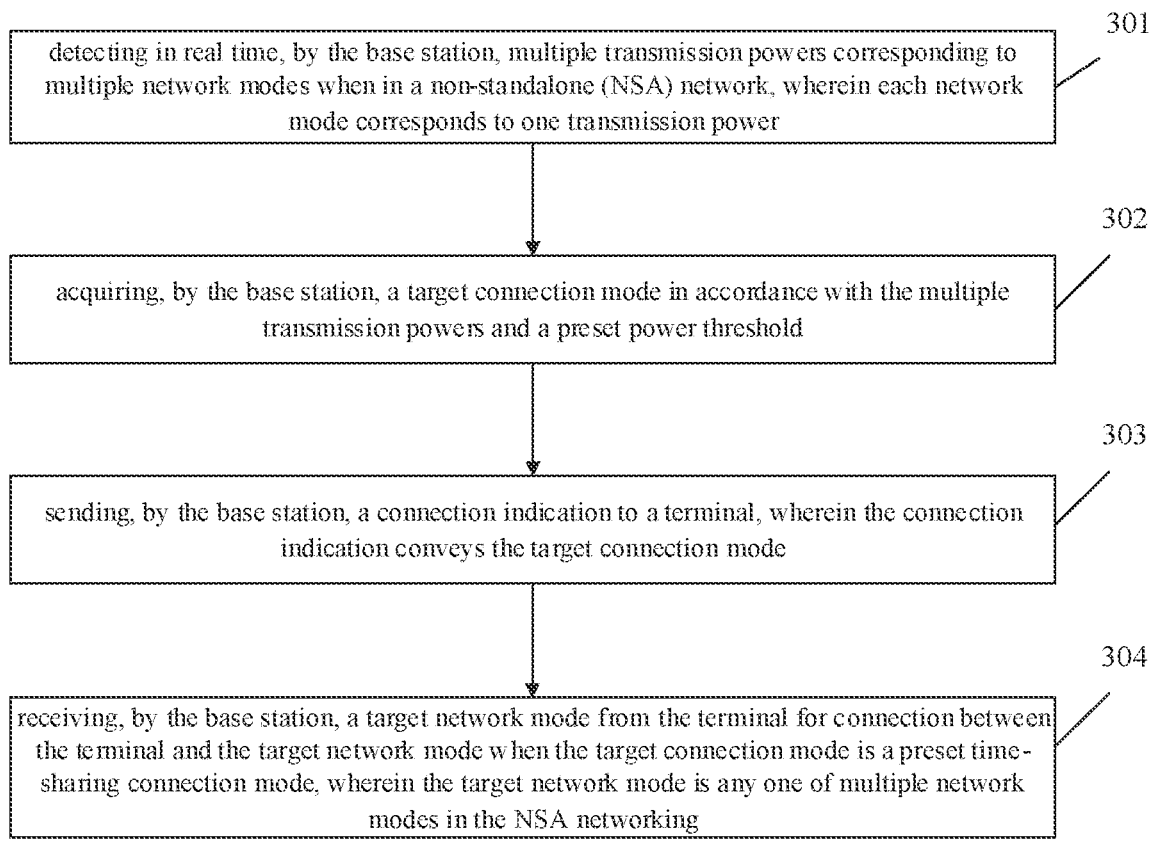
FIG. 2 is a structural diagram of a terminal proposed in embodiments of the present disclosure.

An embodiment of this disclosure provides a network connection method. FIG. 2 is a structural diagram of a terminal proposed in embodiments of the present disclosure. As shown in FIG. 2, in the embodiment of this disclosure, a base station performs a network connection. The connection method can include the following steps:

Step 301: detecting in real time, by the base station, multiple transmission powers corresponding to multiple network modes when in a non-standalone (NSA) network, wherein each network mode corresponds to one transmission power.

In the embodiment of the present disclosure, when the base station is in a non-standalone networking, the base station detects multiple transmission powers corresponding to multiple network modes in the non-standalone networking in real time. Specifically, any network mode in the non-standalone networking corresponds to one transmission power.

Furthermore, in the embodiment of the present disclosure, the NSA may be an EN-DC architecture with a 4G core network, a 4G base station is a primary station, and a 5G base station is a secondary station.

It should be noted that, in the embodiment of the present disclosure, the terminal and the base station may belong to the same area and are in the same non-standalone networking at the same time.

It should be noted that in the embodiments of the present disclosure, according to the different needs of operators, in the actual network deployment of 5G, standalone networking and non-standalone networking may respectively cover different areas, but it may also be that a certain area has standalone or non-standalone networking. For example, a 5G base station can work in standalone networking mode to support independent access to the 5G network for the user plane and control plane of the terminal, and the base station can also work in non-standalone networking mode to support control plane of terminals anchored in the existing LTE network, and the 5G network is used to convey user plane data transmission.

Furthermore, in the embodiments of the present disclosure, a base station, i.e., a public mobile communication base station, is a form of radio station, which refers to a radio transceiver station, performing information transfer with mobile terminal via mobile switching centers and in a certain radio coverage area. The construction of mobile communication base stations generally revolves factors such as coverage, call quality, investment benefits, ease of construction, and ease of maintenance. With the development of mobile communication network services towards data and packetization, the development trend of mobile communication base stations is bound to be broadband, large coverage construction and IP.

It should be noted that in the embodiments of the present disclosure, due to the limitation of the terminal radio frequency power, in general, the maximum power of the terminal cannot exceed 23 Lbm, and when the transmit power of LTE and NR are both large, the terminal will have a large Network coverage risk. Therefore, the base station needs to separately detect the transmission power of multiple network modes in the non-standalone networking to determine multiple transmission powers corresponding to the multiple network modes. For example, when the base station is in a non-standalone networking, if the non-standalone networking is a dual connection of LTE and NR new wireless, then the base station can detect and obtain two transmission powers corresponding to LTE and NR, respectively.

Step 302: acquiring a target connection mode in accordance with the multiple transmission powers and a preset power threshold.

In the embodiment of the present disclosure, after the base station detects multiple transmission powers corresponding to multiple network modes in the non-standalone networking in real time, it can obtain the target connection mode according to the multiple transmission powers and the preset power threshold.

It should be noted that, in the embodiment of the present disclosure, the target connection mode may include a preset time-sharing connection mode and a preset simultaneous connection mode. Where when the terminal and the base station are both in a non-standalone networking, the preset simultaneous connection mode can be a mode in which multiple network modes in the non-standalone networking are all connected, and the preset time-sharing connection mode can be a non-standalone networking multiple network modes in are not connected at the same time.

Furthermore, in the embodiment of the present disclosure, the terminal and the base station can switch between the preset simultaneous connection mode and the preset time-sharing connection mode. When the terminal and the base station are in a preset time-sharing connection mode, the terminal can switch between LTE and NA.

It should be noted that, in the embodiment of the present disclosure, when the terminal and the base station are in a non-standalone networking, if the non-standalone networking is a dual connection of LTE and NR new wireless, then the target connection mode can be the preset simultaneous connection mode or preset time-sharing connection mode. The preset simultaneous connection mode may be a mode in which both LTE and NR are in a connected state, and the preset time-sharing connection mode may be a mode in which LTE and NR are not in a connected state at the same time.

Furthermore, in the embodiment of the present disclosure, after the base station determines multiple transmission powers corresponding to multiple network modes in the non-standalone networking, the terminal can compare the multiple transmission powers with the preset power threshold respectively for determining the target connection mode according to the comparison result.

Furthermore, in the embodiment of the present disclosure, the preset power threshold may include an upper power threshold and a lower power threshold. When the base station acquires the target connection mode according to multiple transmit powers and the preset power threshold, and if the transmit power is greater than the upper power threshold, the base station considers that the terminal may be at risk in this scenario, and accordingly the base station configured the target connection mode to the preset time-sharing connection mode; correspondingly, if multiple transmit powers are less than the lower power threshold, the base station can consider that the terminal may not be at risk in this scenario, and accordingly the base station configured the target connection mode to the preset simultaneous connection mode.

It should be noted that in the embodiments of the present disclosure, due to the limitation of the terminal radio frequency power, in general, the maximum power of the terminal cannot exceed 23 Lbm, and when the transmit power of LTE and NR are both large, the terminal will have a large Network coverage risk. Therefore, the base station can determine a safer and more suitable target connection mode according to the transmission power of both LTE and NR, that is, selecting between a preset time-sharing connection mode and a preset simultaneous connection mode. For example, when the LTE and NR transmit powers both reach 20 dbm, the station building can configure the target connection mode to the preset time-sharing connection mode.

Step 303: sending, by the base station, a connection indication to a terminal, wherein the connection indication conveys the target connection mode.

In the embodiment of the present disclosure, after the base station acquires the target connection mode according to multiple transmission powers and the preset power threshold, the base station may send a connection indication, which conveys the target connection mode, to the terminal.

It should be noted that, in the embodiment of the present disclosure, the connection indication may be determination of the connection mode by the base station.

Furthermore, in the embodiment of the present disclosure, if the target connection mode is the preset time-sharing connection mode, the terminal cannot connect with multiple network modes in the non-standalone network at the same time. If the target connection mode is the preset simultaneous connection Mode, the terminal can connect with multiple network modes in the non-standalone network at the same time. Therefore, the base station can send a connection indication, which conveys the target connection mode, to the terminal to further determine the network to which the terminal needs to connect.

It should be noted that, in the embodiment of the present disclosure, before the terminal receives the connection indication sent by the base station, the base station and the terminal may be in a preset simultaneous connection mode or a preset time-sharing connection mode.

Step 304: receiving a target network mode from the terminal for connection between the terminal and the target network mode when the target connection mode is a preset time-sharing connection mode, wherein the target network mode is any one of multiple network modes in the NSA networking.

In the embodiment of the present disclosure, after the base station sends a connection indication to the terminal, when the target connection mode is the preset time-sharing connection mode, the base station can receive the target network mode sent by the terminal in response to the connection indication, and then controls terminal to connect in the target network mode.

It should be noted that, in the embodiment of the present disclosure, the target network mode may be any one of multiple network modes in the non-standalone networking. For example, for the LTE and NR dual connection mode of the EN-DC scheme, the target network mode can be either the LTE mode or the NR mode.

Furthermore, in the embodiment of the present disclosure, when the target connection mode is the preset time-sharing connection mode, the terminal can select the target network mode from multiple network modes according to its current service type, and then send it to the base station. For example, for the LTE and NR dual connection mode of the EN-DC solution, if the target connection mode is the preset time-sharing connection mode, the terminal can choose to access the 4G network or the 5G network.

In the embodiment of the present disclosure, further, when the target connection mode is the preset time-sharing connection mode, the base station receives the target network mode sent by the terminal and realizes the connection between the terminal and the target network mode. The method can also include the following steps:

Step 305: receiving an updated target network mode sent by the terminal for connection between the terminal and the updated target network mode.

It should be noted that in the embodiment of the present disclosure, after the base station receives the target network mode sent by the terminal and realizes the connection between the terminal and the target network mode, the base station can also receive the updated target network mode sent by the terminal, and then can realize the connection between the terminal and the updated target network mode.

It should be noted that in the embodiment of the present disclosure, the updated target network mode may be any one of the multiple network modes in the non-standalone networking. For example, for the LTE and NR dual connection mode of the EN-DC solution, the updated target network mode can be either the LTE mode or the NR mode. Specifically, the updated target network mode can be any network mode that is different from the target network mode in the non-standalone networking, that is, for the LTE and NR dual connection mode of the EN-DC scheme, when the target network mode. In the LTE mode, the updated target network mode is the NR mode.

This disclosure provides a network connection method. When in a non-standalone network, the base station detects multiple transmission powers corresponding to multiple network modes in the non-standalone network in real time; where one network mode corresponds to one transmission power; acquiring a target mode according to multiple transmit power and a preset power threshold; sending a connection indication to the terminal; where the connection indication conveys the target connection mode; when the target connection mode is the preset time-sharing connection mode, receiving the target network mode sent by the terminal, and the connection between the terminal and the target network mode is realized; the target network mode is any one of the multiple network modes. It can be seen that, in the implementation of this disclosure, when the terminal and the base station are in non-standalone networking, the base station determines the target connection mode according to the multiple transmission powers corresponding to the multiple network modes, and then sending the connection indication conveying the target connection mode to the terminal. If the target connection mode is the preset time-sharing connection mode, the base station can receive the target network mode sent by the terminal, and realize the connection between the terminal and the target network mode, so as to meet the radio frequency power of the terminal when it is in a non-standalone network. When the transmission power of LTE and NR are both large, the risk of the terminal is reduced, and the security is improved.

Figure 3:
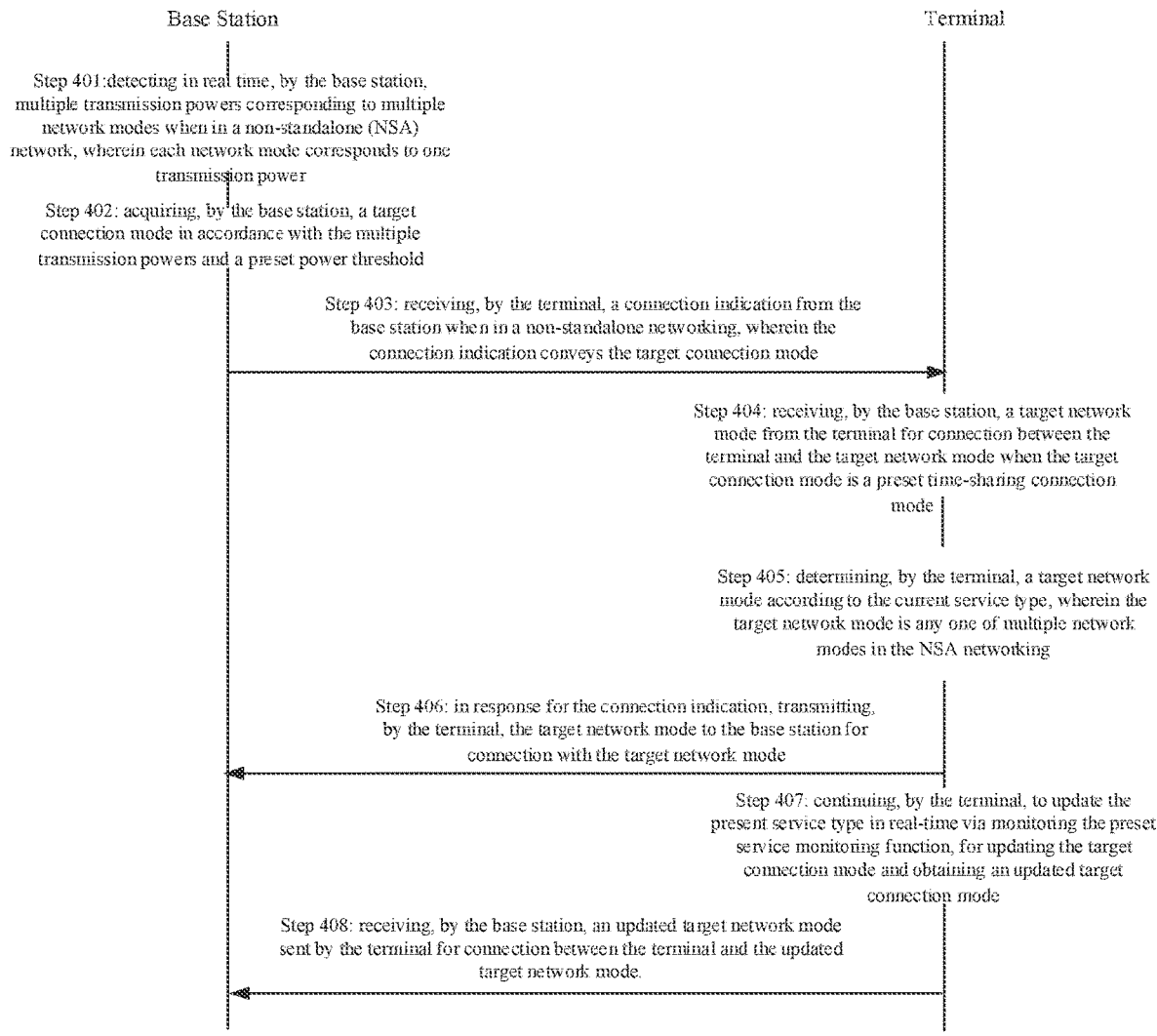
FIG. 3 is a structural diagram of a terminal in the prior art.

Based on the above embodiment, in another embodiment of the present disclosure, FIG. 3 is a third schematic diagram of the composition architecture of a base station proposed in an embodiment of the disclosure. As shown in FIG. 3, in the embodiment of this disclosure, the method for network connection between the terminal and the base station may include the following steps:

Step 401: detecting in real time, by the base station, multiple transmission powers corresponding to multiple network modes when in a non-standalone (NSA) network, wherein each network mode corresponds to one transmission power;

In the embodiment of the present disclosure, when the base station is in a non-standalone networking, multiple transmission powers corresponding to multiple network modes in the non-standalone networking can be detected in real time. Specifically, any network mode in the non-standalone networking corresponds to a transmission power.

Step 402: acquiring, by the base station, a target connection mode in accordance with the multiple transmission powers and a preset power threshold.

In the embodiment of the present disclosure, after the base station detects multiple transmission powers corresponding to multiple network modes in the non-standalone networking in real time, the base station can obtain the target connection mode according to the multiple transmission powers and the preset power threshold.

It should be noted that, in the embodiment of the present disclosure, the target connection mode may include a preset time-sharing connection mode and a preset simultaneous connection mode. Where when the terminal and the base station are both in a non-standalone networking, the preset simultaneous connection mode can be a mode in which multiple network modes in the non-standalone networking are all connected, and the preset time-sharing connection mode can be a non-standalone networking Multiple network modes in are not connected at the same time.

Step 403: receiving, by the terminal, a connection indication from the base station when in a non-standalone networking, wherein the connection indication conveys the target connection mode.

In the embodiment of the present disclosure, when in a non-standalone networking, the terminal can receive the connection indication sent by the base station.

It should be noted that, in the embodiment of the present disclosure, the connection indication may be the determination of the connection mode by the base station, wherein the connection indication conveys the target connection mode.

It should be noted that, in the embodiment of the present disclosure, the terminal and the base station may belong to the same area and are in the same non-standalone networking at the same time.

Step 404: receiving, by the base station, a target network mode from the terminal for connection between the terminal and the target network mode when the target connection mode is a preset time-sharing connection mode.

In the embodiment of the present disclosure, after the terminal receives the connection indication sent by the base station, if the target connection mode conveyed in the connection indication is the preset time-sharing connection mode, the terminal can enable the preset service monitoring function to acquire the current service type.

It should be noted that, in the embodiment of the present disclosure, when the target connection mode is the preset time-sharing connection mode, the terminal can select any network between LTE and NA for connection, and at the same time, it can also connect between LTE and NA. Therefore, the terminal needs to monitor the current service type. That is, the preset service monitoring function needs to be turned on, so that the current service type can be monitored to further select a suitable network for connection.

Step 405: determining, by the terminal, a target network mode according to the current service type, wherein the target network mode is any one of multiple network modes in the NSA networking.

In the embodiment of the present disclosure, when the target connection mode is the preset time-sharing connection mode, after the terminal initiating the preset service monitoring function and acquiring the current service type, the terminal can determine the target network mode corresponding service type according to the current service type.

It should be noted that, in the embodiment of the present disclosure, the target network mode may be any one of multiple network modes in the non-standalone networking. For example, for the LTE and NR dual connection mode of the EN-DC solution, the target network mode can be either the LTE mode or the NR mode.

Step 406: in response to the connection indication, transmitting, by the terminal, the target network mode to the base station for connection with the target network mode.

In the embodiment of the present disclosure, after the terminal determines the target network mode corresponding to the current service type according to the current service type, it can respond to the connection indication sent by the base station and send the target network mode to the base station so that it can connect to the target network mode.

Furthermore, in the embodiment of the present disclosure, when the target connection mode carried in the connection indication is the preset time-sharing connection mode, that is, the base station instructs the terminal to select any network between LTE and NA for connection, and the terminal will determine a suitable target network mode according to the current service type acquired by monitoring, and then sends the target network mode to the base station to inform the base station, and the base station can control the terminal to access the target network mode.

Step 407: continuing, by the terminal, to update the present service type in real-time via monitoring the preset service monitoring function, for updating the target connection mode and obtaining an updated target connection mode.

In the embodiment of this disclosure, after the terminal sends the target network mode to the base station and is connected to the target network mode, it can continue to update the current service type in real time through the preset service monitoring function, so that the target network mode can be updated in real time, and then get the updated target network mode.

Step 408: receiving, by the base station, an updated target network mode sent by the terminal for connection between the terminal and the updated target network mode.

It should be noted that in the embodiment of the present disclosure, after the base station receives the target network mode sent by the terminal and realizes the connection between the terminal and the target network mode, it can also receive the updated target network mode sent by the terminal, and then can realize the connection between the terminal and the updated target network mode.

It should be noted that in the embodiment of the present disclosure, the updated target network mode may be any one of the multiple network modes in the non-standalone networking. For example, for the LTE and NR dual connection mode of the EN-DC solution, the updated target network mode can be either the LTE mode or the NR mode. Specifically, the updated target network mode can be any network mode that is different from the target network mode in the non-standalone networking, that is, for the LTE and NR dual connection mode of the EN-DC scheme, when the target network mode. In the LTE mode, the updated target network mode is the NR mode.

This disclosure provides a network connection method, including receiving, by the terminal, a connection indication from a base station when in a non-standalone (NSA) networking, wherein the connection indication includes a target connection mode; initiating, by the terminal, a preset service monitoring function when the target connection mode is a preset time-sharing connection mode, and acquiring, by the terminal, a current service type; determining, by the terminal, a target network mode according to the current service type, wherein the target network mode is any one of multiple network modes in the NSA networking; in response for the connection indication, transmitting, by the terminal, the target network mode to the base station for connection with the target network mode. It can be seen that, in the implementation of this disclosure, when the terminal and the base station are in non-standalone networking, the base station determines the target connection mode according to multiple transmission powers corresponding to multiple network modes, and the terminal receives the target connection sent by the base station. After the connection indication of the mode, if the target connection mode is the preset time-sharing connection mode, the terminal determines the current service type through the preset service monitoring function, and further determines the target network mode, and the terminal sends the target network mode to the base station to realize the connection. The connection with the target network mode can meet the requirements of terminal radio frequency power when in a non-standalone network. When the transmission power of LTE and NR are both large, the risk of the terminal is reduced, and the security is improved.

Figure 4:
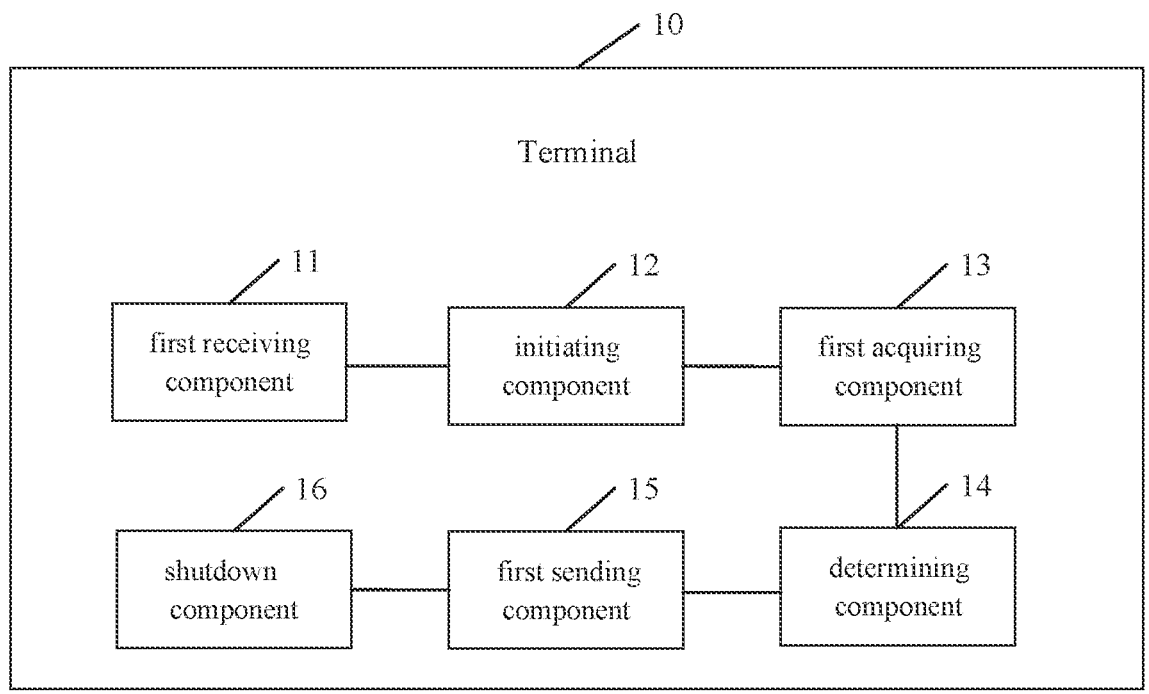
FIG. 4 is a first schematic diagram of the composition architecture of a terminal proposed in an embodiment of the disclosure.

Based on the above-mentioned embodiment, in another embodiment of the present disclosure, FIG. 4 is a first schematic diagram of the composition architecture of a terminal proposed in an embodiment of the disclosure. As shown in FIG. 4, the terminal 10 proposed in the embodiment of the present disclosure may include a receiving component 11, an initiating component 12, a first acquiring component 13, a determining component 14, a first sending component 15, and a shutdown component 16.

The first receiving component 11 is configured to receive a connection indication from a base station, wherein the connection indication includes a target connection mode when the terminal is in a non-standalone (NSA) network.

The initiating component 12 is configured to initiate a preset service monitoring function when the target connection mode is a preset time-sharing connection mode.

The first acquiring component 13 is configured to acquire a current service type.

The determining component 14 is configured to determine a target network mode according to the current service type, wherein the target network mode is any one of multiple network modes in the NSA network.

The first sending component 15 is configured to transmit the target network mode to the base station for connection with the target network mode in response to the connection indication.

Furthermore, in the embodiment of the present disclosure, the first acquiring component 13 is further configured to monitor a current status parameter and a current execution parameter, and acquire the current service type according to the current status parameter and the current execution parameter.

Furthermore, in the embodiment of the present disclosure, the determining component 14 is specifically configured to determine a resource allocation ratio parameter according to the current service type; and determine the target network mode according to the resource allocation parameter.

Furthermore, in the embodiment of the present disclosure, the shutdown component 16 is configured to shutting down the preset service monitoring function when the target connection mode is a preset simultaneous connection mode.

Furthermore, in the embodiment of the present disclosure, the first acquiring component 13 is further configured to respond to the connection indication and send the target network mode to the base station to connect to the target network mode, and to update the present service type in real-time via monitoring the preset service monitoring function, for updating the target connection mode and obtaining an updated target connection mode.

The first sending component 15 is further configured to send the updated target network mode to the base station for connection in the updated target network mode when the updated target connection mode is different from the target connection mode.

Figure 5:
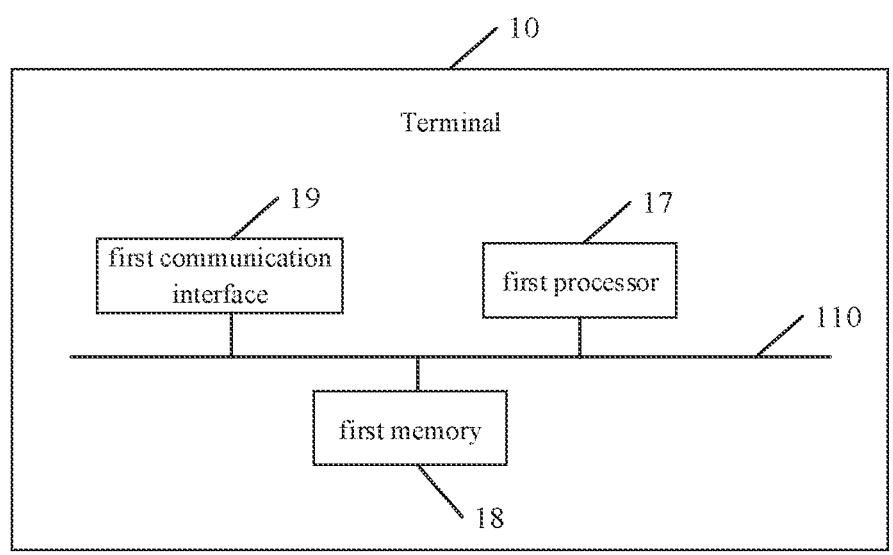
FIG. 5 is a second schematic diagram of the composition architecture of a terminal proposed in an embodiment of the disclosure.

FIG. 5 is a second schematic diagram of the composition architecture of the terminal proposed in the embodiment of the disclosure. As shown in FIG. 5, the terminal 10 may further include a first processor 17, a first memory 18, a first communication interface 19, and a first bus 110 for connecting the first processor 17, the first memory 18, and the first communication interface 19.

In the embodiment of the present disclosure, the above-mentioned first processor 17 may be a Disclosure Specific Integrated Circuit (ASIC), a digital signal processor (Digital Signal Processor, DSP), or a digital signal processing device (Digital Signal Processing Device). DSPD), Programmable Logic Device (ProgRAMmable Logic Device, PLD), Field Programmable Gate Array (Field ProgRAMmable Gate Array, FPGA), Central Processing Unit (CPU), Controller, Microcontroller, Microprocessing. At least one of the devices. It is understandable that, for different devices, the electronic devices used to implement the above-mentioned processor functions may also be other, which is not specifically limited in the embodiment of the present disclosure. The terminal 10 may further include a first memory 18, which may be connected to the first processor 17, wherein the first memory 18 is used to store executable program code, the program code includes computer operation indications, the first memory 18. It may include high-speed RAM memory, and may also include non-volatile memory, for example, at least two disk memories.

In the embodiment of the present disclosure, the first bus 110 is used to connect the first communication interface 19, the first processor 17, and the first memory 18 and the mutual communication between these devices.

In the embodiment of the present disclosure, the first memory 18 is used to store indications and data.

Furthermore, in the embodiment of the present disclosure, the above-mentioned first processor 17 is configured to a connection indication from a base station when in a non-standalone (NSA) networking, wherein the connection indication includes a target connection mode; initiate a preset service monitoring function when the target connection mode is a preset time-sharing connection mode, and acquire a current service type; determine a target network mode according to the current service type, wherein the target network mode is any one of multiple network modes in the NSA networking; in response for the connection indication, transmit the target network mode to the base station for connection with the target network mode.

In practical disclosures, the above-mentioned first memory 18 may be a volatile memory (volatile memory), such as a random access memory (Random-Access Memory, RAM); or a non-volatile memory (non-volatile memory), such as a volatile memory. Read-only memory (Read-Only Memory, ROM), flash memory (flash memory), hard disk (Hard Disk Drive, HDD) or solid-state drive (Solid-State Drive, SSD); or a combination of the above types of memory, and provide indications and data to the first processor 17.

In addition, the functional modules in this embodiment may be integrated into one processing unit, or each unit may exist alone physically, or two or more units may be integrated into one unit. The above-mentioned integrated unit can be realized in the form of hardware or software function module.

If the integrated unit is implemented in the form of a software function module and is not sold or used as an independent product, it can be stored in a computer readable storage medium. Based on this understanding, the technical solution of this embodiment is essentially or correct part that contributes to the prior art or all or part of the technical solution can be embodied in the form of a software product. The computer software product is stored in a storage medium and includes several indications to enable a computer device (which can be a personal A computer, a server, or a network device, etc.) or a processor (processor) execute all or part of the steps of the method in this embodiment. The aforementioned storage media include: U disk, mobile hard disk, read only memory (Read Only Memory, ROM), random access memory (Random Access Memory, RAM), magnetic disk or optical disk and other media that can store program codes.

This disclosure provides a terminal. A method includes receiving, by the terminal, a connection indication from a base station when in a non-standalone (NSA) networking, wherein the connection indication includes a target connection mode; initiating, by the terminal, a preset service monitoring function when the target connection mode is a preset time-sharing connection mode, and acquiring, by the terminal, a current service type; determining, by the terminal, a target network mode according to the current service type, wherein the target network mode is any one of multiple network modes in the NSA networking; in response for the connection indication, transmitting, by the terminal, the target network mode to the base station for connection with the target network mode. It can be seen that, in the implementation of this disclosure, when the terminal and the base station are in non-standalone networking, the base station determines the target connection mode according to multiple transmission powers corresponding to multiple network modes, and the terminal receives the target connection sent by the base station. After the connection indication of the mode, if the target connection mode is the preset time-sharing connection mode, the terminal determines the current service type through the preset service monitoring function, and further determines the target network mode, and the terminal sends the target network mode to the base station to realize the connection. The connection with the target network mode can meet the requirements of terminal radio frequency power when in a non-standalone network.

When the transmission power of LTE and NR are both large, the risk of the terminal is reduced and the security is improved.

Figure 6:
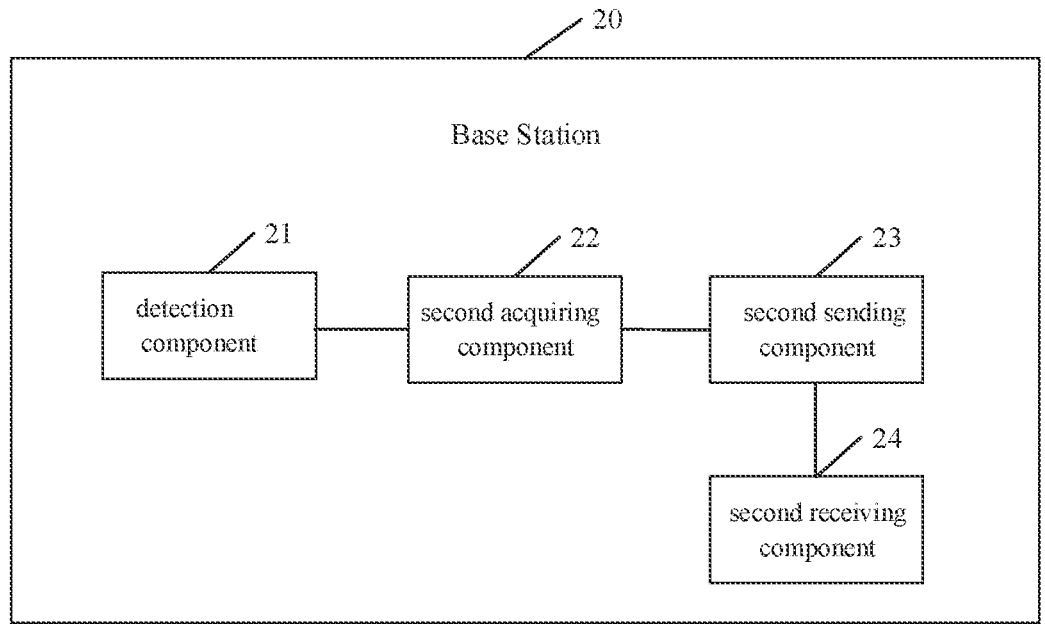
FIG. 6 is a first schematic diagram of the composition architecture of a base station proposed in an embodiment of the disclosure.

Based on the foregoing embodiment, in another embodiment of the present disclosure, FIG. 6 is a first schematic diagram of the composition architecture of a base station proposed in an embodiment of the disclosure. As shown in FIG. 6, the base station 20 proposed in the embodiment of the present disclosure may include a detection component 21, a second acquiring component 22, a second sending component 23, and a second receiving component 24.

The detection component 21 is configured to detect in real time, by the base station, multiple transmission powers corresponding to multiple network modes when in a non-standalone (NSA) network, wherein each network mode corresponds to one transmission power.

The second acquiring component 22 is configured to acquire a target connection mode according to the multiple transmission powers and a preset power threshold.

The second sending component 23 is configured to send a connection indication to a terminal, wherein the connection indication conveys the target connection mode.

The second receiving component 24 is configured to receive a target network mode from the terminal for connection between the terminal and the target network mode when the target connection mode is a preset time-sharing connection mode, wherein the target network mode is any one of multiple network modes in the NSA networking.

Furthermore, in the embodiment of the present disclosure, the preset power threshold includes a power upper limit threshold and a power lower limit threshold, and the second acquiring component 22 is specifically configured to: when the multiple transmission powers are all greater than the upper power threshold, configuring, by the base station, the target connection mode to the preset time-sharing connection mode; when the multiple transmission powers are all less than the power lower limit threshold, the target connection mode to a preset time-sharing connection mode.

Furthermore, in the embodiment of the present disclosure, the second receiving component 24 is also configured to receive the target network mode sent by the terminal when the target connection mode is a preset time-sharing connection mode, and after realizing the connection between the terminal and the target network mode, receiving the updated target network mode sent by the terminal, and realizing the connection between the terminal and the updated target network mode.

Figure 7:
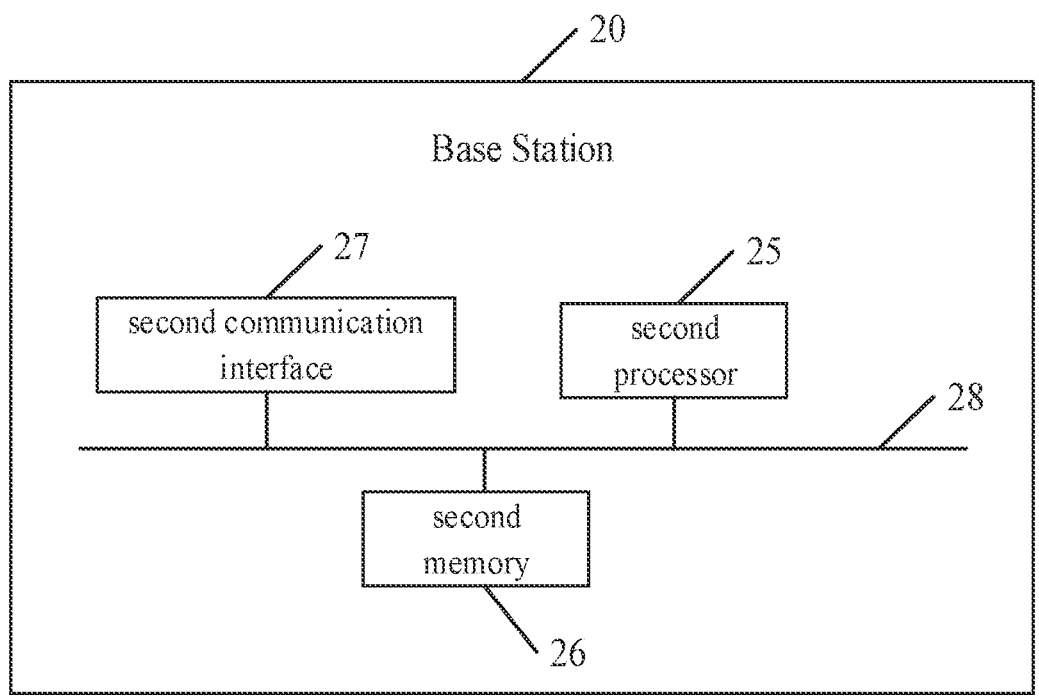
FIG. 7 is a second schematic diagram of the composition architecture of a base station proposed in an embodiment of the disclosure.

FIG. 7 is the second schematic diagram of the composition architecture of the base station proposed in the embodiment of the disclosure. As shown in FIG. 7, the base station 20 may further include a second processor 25, second memory 26, a second communication interface 27 and a second bus 28 for connecting the second processor 25, the second memory 26, and the second communication interface 27.

In the embodiment of the present disclosure, the above-mentioned second processor 25 may be a Disclosure Specific Integrated Circuit (ASIC), a digital signal processor (Digital Signal Processor, DSP), or a digital signal processing device (Digital Signal Processing Device), DSPD), Programmable Logic Device (ProgRAMmable Logic Device, PLD), Field Programmable Gate Array (Field ProgRAMmable Gate Array, FPGA), Central Processing Unit (CPU), Controller, Microcontroller, Microprocessing. At least one of the devices. It is understandable that, for different devices, the electronic devices used to implement the above-mentioned processor functions may also be other, which is not specifically limited in the embodiment of the present disclosure. The base station 20 may further include a second memory 26, which may be connected to the second processor 25, where the second memory 26 is used to store executable program code, the program code includes computer operation indications, and the second memory 26. It may include high-speed RAM memory, and may also include non-volatile memory, for example, at least two disk memories.

In the embodiment of the present disclosure, the second bus 28 is used to connect the second communication interface 27, the second processor 25, the second memory 26, and the mutual communication between these devices.

In the embodiment of the present disclosure, the second memory 26 is used to store indications and data.

Furthermore, in the embodiment of the present disclosure, the second processor 25, is configured to detect in real time multiple transmission powers corresponding to multiple network modes when in a non-standalone (NSA) network, wherein each network mode corresponds to one transmission power; the second acquiring component is configured to acquire a target connection mode in accordance with the multiple transmission powers and a preset power threshold; sending a connection indication to a terminal, wherein the connection indication conveys the target connection mode; the second receiving component is configured to receive a target network mode from the terminal for connection between the terminal and the target network mode when the target connection mode is a preset time-sharing connection mode, wherein the target network mode is any one of multiple network modes in the NSA network.

In practical disclosures, the aforementioned second memory 26 may be a volatile memory (volatile memory), such as a random-access memory (Random-Access Memory, RAM); or a non-volatile memory (non-volatile memory), such as a volatile memory. Read-only memory (Read-Only Memory, ROM), flash memory (flash memory), hard disk (Hard Disk Drive, HDD) or solid-state drive (Solid-State Drive, SSD); or a combination of the above types of memory, and provide indications and data to the second processor 25.

In addition, the functional modules in this embodiment may be integrated into one processing unit, or each unit may exist alone physically, or two or more units may be integrated into one unit. The above-mentioned integrated unit can be realized in the form of hardware or software function module.

If the integrated unit is implemented in the form of a software function module and is not sold or used as an independent product, it can be stored in a computer readable storage medium. Based on this understanding, the technical solution of this embodiment is essentially or correct part that contributes to the prior art or all or part of the technical solution can be embodied in the form of a software product. The computer software product is stored in a storage medium and includes several indications to enable a computer device (which can be a personal computer, a server, or a network device, etc.) or a processor (processor) to execute all or part of the steps of the method in this embodiment. The aforementioned storage media include: U disk, mobile hard disk, read only memory (Read Only Memory, ROM), random access memory (Random Access Memory, RAM), magnetic disk or optical disk and other media that can store program codes.

In the terminal proposed in the embodiment of the present disclosure, the base station detects in real time multiple transmission powers corresponding to multiple network modes when in a non-standalone (NSA) network, wherein each network mode corresponds to one transmission power; the second acquiring component is configured to acquire a target connection mode in accordance with the multiple transmission powers and a preset power threshold; sending a connection indication to a terminal, wherein the connection indication conveys the target connection mode; the second receiving component is configured to receive a target network mode from the terminal for connection between the terminal and the target network mode when the target connection mode is a preset time-sharing connection mode, wherein the target network mode is any one of multiple network modes in the NSA network.

The embodiment of the present disclosure provides a first computer-readable storage medium having a program stored thereon, and the program is executed by a processor to implement the network connection method described above.

Specifically, the program indications corresponding to a network connection method in this embodiment can be stored on storage media such as optical disks, hard disks, U disks, etc. When the program indications corresponding to a network connection method in the storage medium are read or executed by an electronic device, it includes the following steps: when in a non-standalone networking, receiving a connection indication sent by a base station, wherein the connection indication carries a target connection mode; when the target connection mode is the preset time-sharing connection mode, turning on the preset service monitoring function to obtain the current service type; determining the target network mode corresponding to the current service type according to the current service type, wherein the target network mode is any one of a plurality of network modes in the non-standalone networking; and in response to the connection indication, sending the target network mode to the base station to connect to the target network mode.

The embodiment of the present disclosure provides a second computer-readable storage medium with a program stored thereon, and when the program is executed by a processor, the network connection method described above is implemented.

Specifically, the program indications corresponding to a network connection method in this embodiment can be stored on storage media such as optical disks, hard disks, U disks, etc. When the program indications corresponding to a network connection method in the storage medium are integrated, when the electronic device reads or is executed, it includes the following steps: when in a non-standalone networking, detecting in real time multiple transmission powers corresponding to multiple network modes in the non-standalone networking, wherein one network mode corresponds to one transmission power; obtaining the target connection mode according to the multiple transmission powers and the preset power threshold; sending a connection indication to the terminal, wherein the connection indication carries the target connection mode; and when the target connection mode is the preset time-sharing connection mode, receiving the target network mode sent by the terminal, and realizing the connection between the terminal and the target network mode, wherein the target network mode is any one of the multiple network modes.

Those skilled in the art should understand that the embodiments of the present disclosure can be provided as methods, terminals, or computer program products. Therefore, this disclosure may adopt the form of hardware embodiments, software embodiments, or embodiments combining software and hardware. Moreover, this disclosure may adopt the form of a computer program product implemented on one or more computer-usable storage media (including but not limited to disk storage, optical storage, etc.) containing computer-usable program codes.

This disclosure is described with reference to the schematic diagrams and/or block diagrams of the implementation process of the method, equipment (system), and computer program product according to the embodiments of the disclosure. It should be understood that computer program indications can be used to implement each process and/or block in the schematic flow diagram and/or block diagram, and to implement a combination of processes and/or blocks in the schematic flow diagram and/or block diagram. These computer program indications can be provided to the processor of a general-purpose computer, a special-purpose computer, an embedded processor, or other programmable data processing equipment to generate a machine, so that the indications executed by the processor of the computer or other programmable data processing equipment are generated A device for realizing the functions specified in one or more processes in the schematic flow chart and/or one block or multiple blocks in the block diagram.

These computer program indications can also be stored in a computer-readable memory that can guide a computer or other programmable data processing equipment to work in a specific manner, so that the indications stored in the computer-readable memory produce an article of manufacture including the indication device. The device realizes the functions specified in one or more processes in the schematic diagram and/or one block or more in the block diagram.

These computer program indications can also be loaded on a computer or other programmable data processing equipment, so that a series of operation steps are executed on the computer or other programmable equipment to produce computer-implemented processing, so as to execute on the computer or other programmable equipment. The indications provide steps for implementing functions specified in one or more processes in the schematic diagram and/or one block or more in the block diagram.

The above are only embodiments of this disclosure, but the protection scope of this disclosure is not limited to this. Any person skilled in the art can easily think of changes or substitutions within the technical scope disclosed in this disclosure which should be covered in the scope of protection of this disclosure. Therefore, the protection scope of this disclosure should be subject to the protection scope of the claims.

What is claimed is:

1. A method for network connection, applied in a terminal, comprising:
receiving a connection indication from a base station when the terminal is in a non-standalone (NSA) network, wherein the connection indication comprises a target connection mode to determine a network to which the terminal needs to connect, wherein the connection indication is an indication that indicates the target connection mode determined by the base station, wherein the target connection mode is a preset time-sharing connection mode or a preset simultaneous connection mode, the preset time-sharing connection mode indicates the terminal to select any network between long term evolution, LTE, and new radio, NR, for connection, and the preset simultaneous connection mode indicates the terminal to connect to LTE and NR at the same time;

initiating a preset service monitoring function to obtain a current service type of the terminal when the target connection mode is the preset time-sharing connection mode;

acquiring a current service type;

determining a target network mode according to the current service type, wherein the target network mode is one of multiple network modes in the NSA network, and the target network mode is either an LTE mode or an NR mode; and in response to the connection indication, transmitting, by the terminal, the target network mode to the base station for connection with the target network mode.

2. The method of claim 1, further comprising:

monitoring a current status parameter and a current execution parameter; and acquiring the current service type according to the current status parameter and the current execution parameter;

wherein the current status parameter represents a power status, a standby status and a temperature status of the terminal;

wherein the current execution parameter represents a running application program, working status of each application and configuration parameters of the terminal.

3. The method of claim 1, wherein the determining comprises determining a percentage parameter of resource allocation.

4. The method of claim 1, further comprising shutting down the preset service monitoring function when the target connection mode is a preset simultaneous connection mode.

5. The method of claim 1, wherein the processor is configured to update, by the terminal, the current service type in real-time via monitoring the preset service monitoring function, for updating the target connection mode and obtaining an updated target connection mode.

6. The method of claim 1, wherein the current service type is one of service types with different latency requirements or one of service types with different reliability requirements.

7. The method of claim 1, wherein when the current service type is a low-latency service type, the processor is configured to occupy more NR resources than LTE resources by the terminal; or when the current service type is a low-reliability service type, the processor is configured to occupy more LTE resources than NR resources by the terminal.

8. The method of claim 1, wherein the processor is configured to adjust allocation of resources between LTE and NR based on changes in the current service type of the terminal.

9. The method of claim 1, wherein the NSA networking comprises dual connection of LTE and NR in one of three different architectures, and among the three different architectures:

a first architecture comprises E-UTRA-NR Dual Connectivity (EN-DC) with a 4G core network, a primary station being a 4G base station, and a secondary station being a 5G base station;

a second architecture comprises NR-E-UTRA Dual Connectivity (NE-DC) with a 5G core network, a primary station being a 5G base station, and a secondary station being a 4G base station; and a third architecture comprises Next-generation core network E-UTRA-NR Dual Connectivity (NGEN-DC) with a 5G core network, a primary station being a 4G base station, and a secondary station being a 5G base station.

10. A terminal, comprising a first processor and a first memory storing an executable program of the first processor, wherein the executable program can be executed by the first processor to implement a method for network connection, applied in the terminal;

the processor is configured to receive, by the terminal, a connection indication from a base station when in a non-standalone (NSA) networking, wherein the connection indication comprises a target connection mode to determine a network to which the terminal needs to connect, wherein the connection indication is an indication that indicates the target connection mode determined by the base station, wherein the target connection mode is a preset time-sharing connection mode or a preset simultaneous connection mode, the preset time-sharing connection mode indicates the terminal to select any network between long term evolution, LTE, and new radio, NR, for connection, and the preset simultaneous connection mode indicates the terminal to connect to LTE and NR at the same time;

the processor is configured to initiate, by the terminal, a preset service monitoring function to obtain a current service type of the terminal when the target connection mode is the preset time-sharing connection mode;

the processor is configured to acquire, by the terminal, a current service type;

the processor is configured to determine, by the terminal, a target network mode according to the current service type, wherein the target network mode is one of multiple network modes in the NSA networking, and the target network mode is either an LTE mode or an NR mode; and the processor is configured to transmit in response to the connection indication by the terminal, the target network mode to the base station for connection with the target network mode.

11. The terminal of claim 10, wherein the acquiring of the current service type comprises:

monitoring a current status parameter and a current execution parameter; and acquiring the current service type according to the current status parameter and the current execution parameter;

wherein the current status parameter represents a power status, a standby status and a temperature status of the terminal;

wherein the current execution parameter represents a running application program, working status of each application and configuration parameters of the terminal.

12. The terminal of claim 10, wherein in determining the target network mode, the processor is configured to determine a percentage parameter of resource allocation.

13. The terminal of claim 10, wherein the processor is configured to shut down the preset service monitoring function when the target connection mode is a preset simultaneous connection mode.

14. The terminal of claim 10, wherein the processor is configured to update, by the terminal, the current service type in real-time via monitoring the preset service monitoring function, for updating the target connection mode and obtaining an updated target connection mode.

15. The terminal of claim 10, wherein the current service type is one of service types with different latency requirements.

16. The terminal of claim 10, wherein when the current service type is a low-latency service type, the processor is configured to occupy more NR resources than LTE resources by the terminal.

17. The terminal of claim 10, wherein the current service type is one of service types with different reliability requirements.

18. The terminal of claim 10, wherein when the current service type is a low-reliability service type, the processor is configured to occupy more LTE resources than NR resources by the terminal.

19. The terminal of claim 10, wherein the processor is configured to adjust allocation of resources between LTE and NR based on changes in the current service type of the terminal.

20. The terminal of claim 10, wherein the NSA networking comprises dual connection of LTE and NR in one of three different architectures, and among the three different architectures:
- a first architecture comprises E-UTRA-NR Dual Connectivity (EN-DC) with a 4G core network, a primary station being a 4G base station, and a secondary station being a 5G base station;
- a second architecture comprises NR-E-UTRA Dual Connectivity (NE-DC) with a 5G core network, a primary station being a 5G base station, and a secondary station being a 4G base station; and
- a third architecture comprises Next-generation core network E-UTRA-NR Dual Connectivity (NGEN-DC) with a 5G core network, a primary station being a 4G base station, and a secondary station being a 5G base station.

* * * * *